United States Patent Office 3,215,957
Patented Nov. 2, 1965

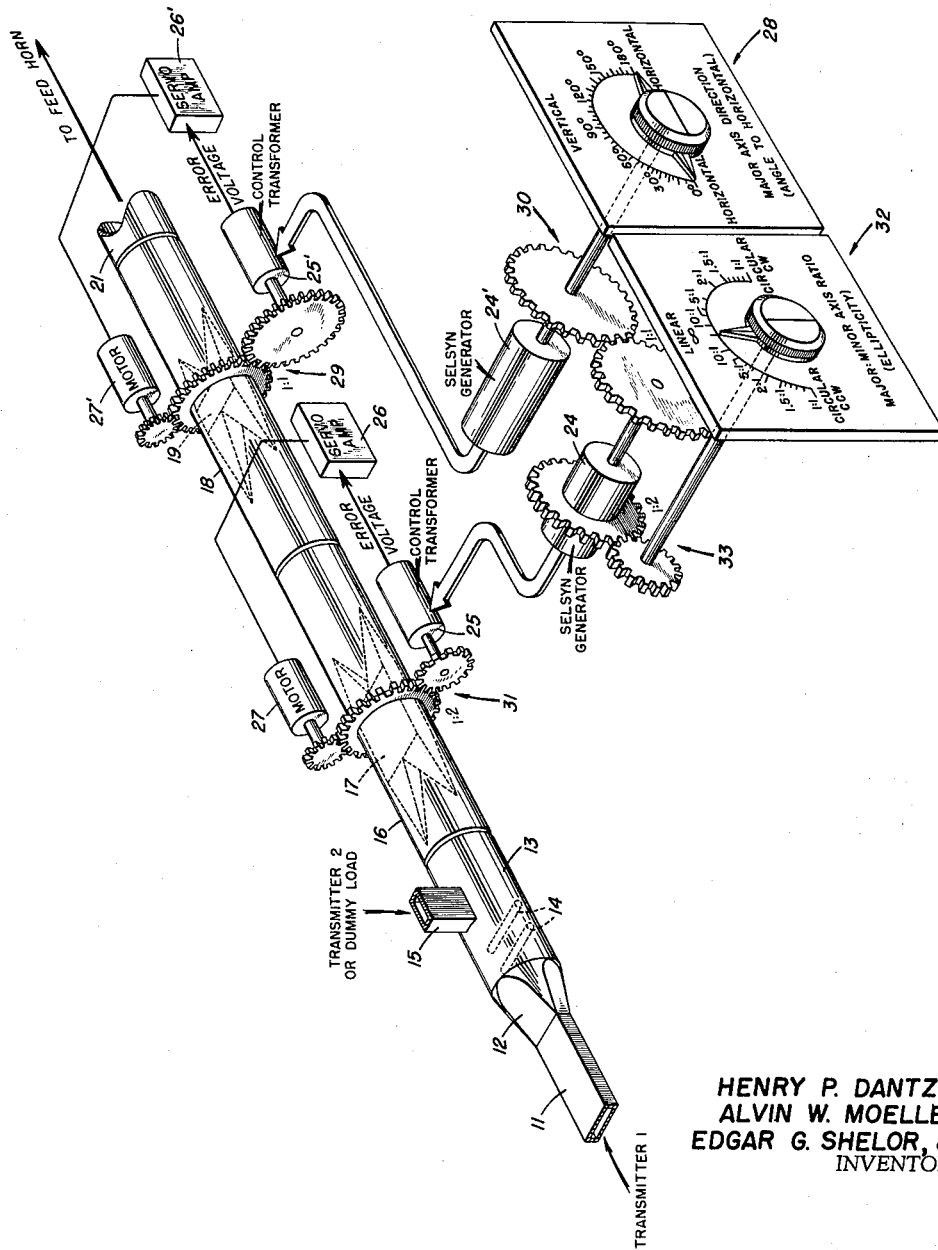

3,215,957
VARIABLE POLARIZATION FOR MICROWAVES
Henry P. Dantzig, Alvin W. Moeller, and Edgar G. Shelor, Jr., Baltimore, Md., assignors to The Bendix Corporation, Towson, Md., a corporation of Delaware
Filed Mar. 5, 1962, Ser. No. 177,540
2 Claims. (Cl. 333—21)

The present invention relates to microwave polarizers. More particularly, it relates to apparatus for polarizing microwaves in any desired degree of ellipticity ranging from plane polarization to circular polarization with the principal polarization plane oriented as may be desired and for accepting and maintaining separate through a single transmission line two signals of different frequencies.

The invention is adapted particularly to use in a radar system where it offers the advantages of providing circular polarization, plane polarization in any desired plane ranging from horizontal to vertical, broadband dual-frequency operation, and location of targets with polarization sensitive cross-sections.

Circular polarization is particularly useful in cancelling echoes from rain drops while plane polarization is generally desirable for maximum power transmission. Occasionally interference from other radar sets or from intentional jamming renders the ability to shift the plane of polarization a desirable feature. For example, if the interfering radar is transmitting horizontally polarized energy, shifting to vertically polarized waves virtually eliminates interference. If the interfering signals are both vertically and horizontally polarized shifting the plane of polarization of the desired signal to some intermediate plane affords considerable discrimination against the interfering signals. Since all waves undergo some change in polarization in travel and some targets are particularly responsive to elliptical polarization or alter circular or plane polarized waves in such a way as to produce elliptically polarized returns, provision of means for generating elliptically polarized waves enhances the performance of a radar.

It is the principal object of this invention to provide apparatus capable of producing waves polarized in any desired degree of ellipticity varying from plane to circular.

It is a further object of the invention to provide elliptical polarization apparatus in which the major axis of the polarization ellipse may be inclined at any desired angle to a reference plane.

Still another object is to provide polarization apparatus of sufficient bandwidth to support a plurality of independent waves. Thus a radar may be equipped to transmit simultaneously signals of two or more frequencies. If one of the signals is intentionally or accidentally interfered with by extraneous signals of the same frequency, the other signals can be relied upon for useful information.

Other objects and many attendant advantages will become apparent as an understanding of the invention is gained through study of the following detailed description and its accompanying drawings.

Briefly, the invention includes a circular waveguide transmission line having a half-wave plate phase shifter and a quarter-wave plate phase shifter positioned in series. Provision is made for introducing plane polarized waves in one end of the waveguide. As the plane polarized waves traverse the half-wave plate phase shifter, a rotation of the plane of polarization is experienced in an amount dependent upon the angle between the polarization plane of the entering waves and the plane of the half-wave plate. The rotated waves then encounter the quarter-wave plate phase shifter which may pass the waves without change of polarization or which may convert the waves into elliptically polarized waves, depending upon the angle at which the plane polarized waves encounter the quarter-wave plate. Provision is made for inter-relating and remotely controlling the positions of the half-wave and quarter-wave plates relative to the polarization plane of the incoming waves so that the desired results may be achieved. Provision is also made for introducing waves polarized in orthogonal planes so that the apparatus may operate simultaneously with waves of two different frequencies.

The single figure of the drawings is a pictorial view of the invention with portions thereof shown in phantom.

Referring to the drawing, a dual orthogonal mode transformer receives energy from a first transmitter (not shown) by way of a first rectangular waveguide input arm 11. The arm 11 is connected to a rectangular to circular waveguide transition section 12 terminating in a circular waveguide section 13. A pair of mode aligning rods 14 positioned within section 13 parallel to the long dimension of waveguide 11 insure that the waves in section 13 entering from section 11 retain their initial plane of polarization. A second rectangular waveguide input arm 15 intersects circular section 13 with the E plane thereof perpendicular to the longitudinal axis of section 13. Waves introduced into section 15 from a second transmitter (not shown) will be propagated through section 13 with their polarization plane orthogonal to the polarization plane of waves from section 11.

A rotatable section 16 of circular waveguide is coupled to section 13 by suitable choke or capacity joints. Such joints are well known in the art and have been omitted from the drawing in order to clarify the illustration of the invention. The mounting means have been omitted also as these may be any obvious bearing and support structure. A dielectric half-wave plate 17, having tapered end portions for matching purposes, is contained within waveguide section 16. A second rotatable waveguide section 18 is coupled to section 17 and contains a quarter-wave plate 19 of dielectric material. Plate 19 is provided with tapered end portions for matching purposes. A fixed section 21 of circular waveguide conducts waves emergent from section 18 to an antenna feed horn or other utilization device. The half-wave plate delays a wave polarized in a plane parallel to the plane of the plate but has negligible effect on a wave polarized in a plane normal to the plate. Waves incident upon the plate at an angle $\theta$ between the polarization plane and a normal to the plate emerge with the polarization plane rotated twice the angle of incidence. The quarter-wave plate similarly introduces a quarter-wave delay on the components of a wave parallel to the plane of the plate and the effect is to produce circular or elliptical polarization of the emergent waves depending upon the angle of incidence of the polarization plane of the entering waves to the plane of the plate. A fuller description of the operation of quarter-wave and half-wave phase shifters is found in the book "Principles and Applications of Waveguide Transmission," by Southworth, D. Van Nostrand Co., publishers, beginning at page 329.

Consider both the half-wave plate 17 and the quarter-wave plate 19 to be horizontal. Then vertically polarized energy entering from waveguide 11 will pass both plates 17 and 19 without effect. Horizontally polarized energy from waveguide 15 will be delayed one-half cycle by plate 17 and one-quarter cycle by plate 19, but will emerge without change in polarization.

Now let plate 17 lie at some intermediate angle to the horizontal, say at 22½°, and let plate 19 be at twice the angle of plate 17 or 45° to the horizontal. Vertical polarized waves from waveguide 11 will be rotated twice the angle of inclination of plate 17 to emerge in a plane at 45° to the vertical. They will thus be either parallel or perpendicular to plate 19. In either case the waves emerging from plate 19 will be plane polarized and rotated an amount equal to the inclination of plate 19. Now let plate 19 be vertical, or four times the angle between plate 17 and horizontal. As before, the waves emerging from plate 17 will be polarized at 45° to the vertical and may be considered as composed of two equal components, one of which is vertical and the other of which is horizontal. The conditions for generating circularly polarized waves are then present, namely, two equal components in space and time quadrature, so that the emergent waves are circularly polarized.

If the angle of incidence, of the waves upon plate 19 is less than 45° the resultant output will be elliptically polarized, the ellipticity ratio increasing as the angle of incidence approaches zero, finally becoming plane polarization at zero incidence angle.

Both initially vertically polarized waves from waveguide 11 and horizontally polarized waves from waveguide 15 will be rotated an equal amount and will undergo similar transformations of polarization as a result of traversing plates 17 and 19. If the rotation of the polarization plane is chosen to be 90°, for example, vertically polarized waves from waveguide 11 will be radiated as horizontally polarized waves and horizontally polarized waves from waveguide 15 will be radiated as vertically polarized waves. If it is desired to convert the entering plane polarized waves to circularly polarized waves, vertically polarized waves from guide 11 will be radiated as circularly polarized waves of one sense, say clockwise, while horizontally polarized waves from waveguide 15 will be radiated as circularly polarized waves of the opposite sense. Both plates 17 and 19 can be constructed with sufficient bandwidth to permit wide separation in the frequencies of the waves from wavesguides 11 and 15 while still producing equal effects on the polarization of the waves. Thus the radar may be operated in diplex fashion or with frequency diversity, if desired.

Again referring to the drawing, two substantially identical interconnected servomechanisms are provided for positioning waveguide sections 16 and 18 to yield the desired polarization quality of the output. The servomechanisms are of conventional design comprising a selsyn generator 24 which converts a displacement input to electrical form. The generator outputs are connected to a control transformer 25 which supplies an error signal to an amplifier 26. Amplifier 26 furnishes power in proportion to the error signal to a servomotor 27 geared to the rotatable waveguide section. The rotor of control transformer 25 is also connected by gears 30 to the rotatable waveguide section to provide follow-up action. When the rotor and stator of generator 24 occupy a particular relative position, an output or error signal will be produced by control transformer 25 so long as its rotor and stator do not occupy the same relative position. The input to motor 27 is polarized to drive the wageguide section and the control transformer rotor in a direction to reduce the error signal. Consequently when the motor 27 comes to rest, the waveguide section will occupy a particular remotely selected position.

The rotor of generator 24' is directly coupled to a dial 28 graduated in degrees from 0–180. Control transformer 25' is geared to waveguide section 18 with 1 to 1 ratio gears 29. A pair of unity ratio gears 30 couples the rotor of generator 24' to the rotor of generator 24. The gears 31 connecting control transformer 25 to waveguide section 16 are of 2 to 1 ratio so that rotation of waveguide section 16 is doubled when coupled to the rotor of transformer 25. Conversely when generator 24 signals a particular angular input, waveguide section 16 is displaced through only one-half that angle in reaching a null. A second dial and shaft assembly 32 is coupled to the stator of generator 24 through 2 to 1 ratio reduction gears 33. The stator of generator 24 is mounted for rotation so that an angular displacement will be signalled to control transformer 25 upon displacement of either the rotor shaft or the stator body.

Dial 28 controls the angle at which the principal polarization plane of the output intersects a reference plane, in this case, horizontal. Rotation of dial 28 to a particular angle causes waveguide section 18 to follow an equal amount. The angular displacement of dial 28 is also communicated through the gears 30 to the rotor of generator 24. Because of the reduction gearing 31 coupling control transformer 25 to waveguide section 16, that section rotates through one-half the angular displacement of dial 28. It will be recalled that for plane polarized energy, plate 19 is aligned with the polarization plane and plate 17 is positioned at one-half the angle of plate 19. To produce circular polarization, plate 17 must be rotated an additional 22½° so that the polarization plane of energy traversing plate 17 will encounter plate 19 at 45°. Dial unit 32 is calibrated in terms of ellipticity ratio ranging from a central plane polarization position with infinite ratio to circular polarization with clockwise sense and 1 to 1 ratio at one dial extremity. Circular polarization with counter clockwise sense appears at the opposite dial extremity. In moving from the linear polarization position to one of the circular polarization positions, dial 32 travels through 90°. This displacement is translated to the required 22½° displacement of waveguide section 16 by means of the one-half reduction in gears 33 and the further one-half reduction in gears 31. The scale of dial 32 may be expanded or compressed from that described by an appropriate change in gear ratios. Similarly, the scale of dial 28 may be altered with appropriate changes in gearing to preserve the necessary angular relationship between plates 17 and 19.

Obviously the invention may be otherwise modified without departing from its teachings. Within the scope of the appended claims, therefore, the invention may be practiced otherwise than as specifically disclosed.

The invention claimed is:
1. A microwave polarizer comprising:
 a first circular waveguide section;
 means for launching plane polarized microwaves into said first waveguide section;
 a second circular waveguide section receiving plane polarized waves from said first waveguide section and mounted for rotation relative thereto;
 a half-wave plate in said second waveguide section;
 first means for rotating said second waveguide section relative to said first waveguide section a selected amount whereby the polarization plane of waves emergent from said second waveguide section can be rotated to any desired angle with respect to the polarization plane of waves in said first waveguide section;
 a third circular waveguide section receiving plane polarized waves from said second waveguide section and mounted for rotation relative thereto;
 a quarter-wave plate in said third waveguide section; and
 second means for rotating said third waveguide section relative to said second waveguide section a selected amount and for rotating said second waveguide section relative to said first waveguide section by one-half said selected relative rotation of said third to said second waveguide sections, said one-half relative rotation being in addition to the selected rotation of said second waveguide section relative to said first waveguide section by said first means;
 whereby selection of the amount of rotation by said first means controls the ellipticity of polarization of waves emergent from said third waveguide section and selection of the amount of rotation by said second means controls the orientation of the plane of the principal axis of polarization of waves emergent from said third waveguide section.

2. A microwave polarizer comprising:
- a first rectangular waveguide section;
- a second rectangular waveguide section;
- a first circular waveguide section, said first and second rectangular waveguide sections being coupled to said first circular waveguide section so as to launch therein waves polarized in orthogonal planes;
- a second circular waveguide section receiving said plane polarized waves from said first circular waveguide section and mounted for rotation relative thereto;
- a half-wave plate in said second circular waveguide section;
- first servo means for rotating said second circular waveguide section relative to said first circular waveguide section whereby the polarization plane of waves emergent from said second circular waveguide section will be rotated a selected amount;
- a third circular waveguide section receiving plane polarized waves from said second circular waveguide section and mounted for rotation relative thereto;
- a quarter-wave plate in said third circular waveguide section;
- second servo means for rotating said third circular waveguide section a selected amount relative to said second circular waveguide section; and
- means causing said first servo means to rotate said second circular waveguide section one-half the amount of the rotation of said third circular waveguide section whereby the orientation of the principal axis of polarization of waves emergent from said third circular waveguide section is selected by control of said second servo means and the ellipticity of polarization of waves emergent from said third circular waveguide section is selected by control of said first servo means.

References Cited by the Examiner

UNITED STATES PATENTS

| | | | |
|---|---|---|---|
| 2,438,119 | 3/48 | Fox | 333—21 |
| 2,607,849 | 8/52 | Purcell et al. | 333—21 |
| 2,787,765 | 4/57 | Fox | 333—21 |
| 2,858,512 | 10/58 | Barnett | 333—21 X |
| 2,930,040 | 3/60 | Weil | 333—21 X |
| 3,089,104 | 5/63 | Allen | 333—21 X |
| 3,089,137 | 5/63 | Pierce | 343—756 X |

FOREIGN PATENTS

| | | |
|---|---|---|
| 732,915 | 4/53 | Great Britain. |
| 818,447 | 10/57 | Great Britain. |

HERMAN KARL SAALBACH, *Primary Examiner.*

ELI LIEBERMAN, *Examiner.*